US009914790B2

(12) United States Patent
Wang et al.

(10) Patent No.: US 9,914,790 B2
(45) Date of Patent: Mar. 13, 2018

(54) LOW MOLECULAR WEIGHT GRAFT POLYMER FOR SCALE INHIBITOR

(71) Applicant: HERCULES INCORPORATED, Wilmington, DE (US)

(72) Inventors: Janice Jianzhao Wang, Hockessin, DE (US); Mohand Melbouci, Wilmington, DE (US)

(73) Assignee: HERCULES LLC, Wilmington, DE (US)

( * ) Notice: Subject to any disclaimer, the term of this patent is extended or adjusted under 35 U.S.C. 154(b) by 64 days.

(21) Appl. No.: 14/872,566

(22) Filed: Oct. 1, 2015

(65) Prior Publication Data
US 2016/0096908 A1    Apr. 7, 2016

Related U.S. Application Data

(60) Provisional application No. 62/060,508, filed on Oct. 6, 2014.

(51) Int. Cl.
*E21B 37/06* (2006.01)
*C09K 8/52* (2006.01)
*C08F 8/32* (2006.01)
*C09K 8/528* (2006.01)
*C02F 5/12* (2006.01)

(52) U.S. Cl.
CPC .................. *C08F 8/32* (2013.01); *C02F 5/12* (2013.01); *C09K 8/528* (2013.01); *E21B 37/06* (2013.01)

(58) Field of Classification Search
CPC .......... C09K 8/24; C09K 8/588; C09K 8/592; C09K 8/528; C09K 8/54; E21B 43/24; E21B 37/06
See application file for complete search history.

(56) References Cited

U.S. PATENT DOCUMENTS

| 4,126,549 | A | 11/1978 | Jones et al. |
| 4,608,411 | A | 8/1986 | Meunier et al. |
| 5,070,164 | A | 12/1991 | Min et al. |
| 5,080,809 | A * | 1/1992 | Stahl ...................... C08F 226/06 166/270.1 |
| 5,090,479 | A | 2/1992 | Read et al. |
| 5,162,086 | A | 11/1992 | Migdal et al. |
| 5,227,446 | A | 7/1993 | Denzinger et al. |
| 5,656,646 | A | 8/1997 | Perner et al. |
| 8,227,381 | B2 | 7/2012 | Rodrigues et al. |

(Continued)

FOREIGN PATENT DOCUMENTS

| CA | 2186289 C | 1/2008 |
| EP | 0599832B1 B1 | 7/1996 |

(Continued)

Primary Examiner — Zakiya W Bates
(74) Attorney, Agent, or Firm — Shaorong Chen

(57) ABSTRACT

The present disclosure relates generally to a composition comprising a low molecular weight graft polymer. The graft polymer is a graft homopolymer, copolymer or terpolymer. Additionally, the present disclosure relates to a scale inhibitor composition comprising the low molecular weight graft polymer. Furthermore, the present disclosure relates to a process for preventing the deposition of scale from water or aqueous solution and a method for scale inhibition treatment of an oil or gas production well by using the low molecular weight graft polymer. The scale inhibitor is low corrosive for application in the oilfield.

21 Claims, 1 Drawing Sheet

(56) References Cited

U.S. PATENT DOCUMENTS

| | | | |
|---|---|---|---|
| 8,246,857 B2 * | 8/2012 | Guzmann | ................. C02F 5/12 252/392 |
| 8,623,151 B2 | 1/2014 | Olson et al. | |
| 2014/0100142 A1 | 4/2014 | MacEwan | |

FOREIGN PATENT DOCUMENTS

| | | |
|---|---|---|
| WO | WO2012061147 A1 | 5/2012 |
| WO | WO2014055340 A1 | 4/2014 |

\* cited by examiner

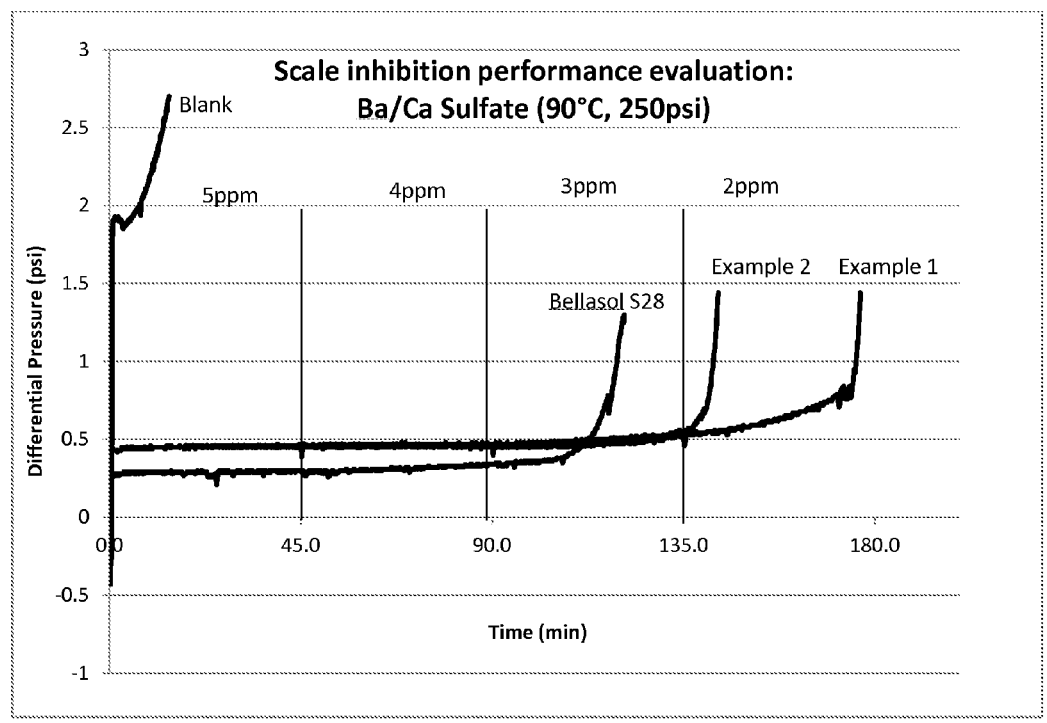

US 9,914,790 B2

LOW MOLECULAR WEIGHT GRAFT POLYMER FOR SCALE INHIBITOR

CROSS REFERENCE TO RELATED APPLICATIONS

The present application claims the benefit under 35 U.S.C. 119(e) of U.S. Provisional Patent Application Ser. No. 62/060,508, filed on Oct. 6, 2014, the entire content of which is hereby expressly incorporated herein by reference.

BACKGROUND

1. Field of the Invention

The presently disclosed and/or claimed inventive process(es), procedure(s), method(s), product(s), result(s), and/or concept(s) (collectively referred to hereinafter as the "presently disclosed and/or claimed inventive concept(s)") relates generally to a composition comprising a graft polymer. More particularly, but not by way of limitation, the presently disclosed and/or claimed inventive concept(s) relates to a composition comprising a low molecular weight graft polymer. The graft polymer can be a graft homopolymer, copolymer, and terpolymer. Additionally, the presently disclosed and/or claimed inventive concept(s) relates to a scale inhibitor composition comprising the low molecular weight graft polymer. Furthermore, the presently disclosed and/or claimed inventive concept(s) relates to a process for preventing the deposition of scale from water or aqueous solution and a method for scale inhibition treatment of an oil or gas production well by using the low molecular weight graft polymer. The scale inhibitor is low corrosive for application in the oilfield.

2. Background of the Invention

In most aqueous systems used in industry, such as in cooling towers, in boilers and in formation fluids and production fluids for oil and gas extraction, the formation and deposition of scales cause severe problems for these systems. The scales commonly encountered include calcium carbonate, calcium sulfate, barium sulfate, magnesium carbonate, magnesium hydroxide, strontium carbonate and strontium sulfate. The scales formed and deposited can lead to the plug of the pipes and bores, the sticking of valves and the damage or hindrance of equipment, particularly those with moving parts. Thus, the aqueous systems used in industry are generally treated with one or more scale inhibitors to minimize and/or prevent scale deposition in the systems.

Current methods for inhibiting formation of inorganic deposits of scale employ compounds containing phosphorus, usually polymers of the carboxylic acid, sulfonic acid, or phosphoric type.

Treatment levels up to a few hundred parts per million (ppm) of scale inhibitors are usually effective. The scale-inhibiting polymer is typically added to the fluid to be treated or may be applied to oil bearing formations by means of "squeeze treatment". Squeeze treatment involves pumping a scale inhibitor into an oil production well so that the inhibitor enters the formation rock and is retained there. When the well is put back into production, the produced fluids are treated by the scale inhibitor which leaches out of the formation rock. Thus the scale inhibitor is released into a fluid. The scale inhibitor may be applied in an aqueous or non-aqueous medium. The objective is to prevent or control the scale formation in systems wherein the fluid is used.

Capillary injection is another method for delivering scale inhibiting materials. In capillary injection, a relatively concentrated form of the scale inhibitor composition is continuously pumped into the well during production.

BRIEF DESCRIPTION OF THE FIGURES

FIG. 1 shows the comparative dynamic scale loop (DSL) test results of Bellasol S28 with the samples of Examples 1 and 2.

DETAILED DESCRIPTION OF THE INVENTIVE CONCEPT(S)

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of preferred embodiments, it will be apparent to those of ordinary skill in the art that variations may be applied to the articles and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAAB-CCCC, CBBAAA, CABABB, and so forth. The skilled artisan will understand that typically there is no limit on the number of items or terms in any combination, unless otherwise apparent from the context.

As used herein any reference to "one embodiment" or "an embodiment" means that a particular element, feature, structure, or characteristic described in connection with the embodiment is included in at least one embodiment. The appearance of the phrase "in one embodiment" in various places in the specification are not necessarily all referring to the same embodiment.

The presently disclosed and/or claimed inventive concept(s) encompasses a low molecular weight graft polymer. The graft polymer can be a graft homopolymer, copolymer or terpolymer.

In one aspect, the presently disclosed and/or claimed inventive concept(s) relates to a low molecular weight graft homopolymer produced by polymerizing a mono-ethylenically unsaturated carboxylic acid to form a homopolymer and grafting a morpholine compound onto the homopolymer.

In another aspect, the presently disclosed and/or claimed inventive concept(s) relates to a low molecular weight graft copolymer produced by polymerizing a mono-ethylenically unsaturated carboxylic acid monomer and a mono-ethylenically unsaturated monomer to form a copolymer and grafting a morpholine compound onto the copolymer. The mono-ethylenically unsaturated monomer is different from the mono-ethylenically unsaturated carboxylic acid for the copolymerization.

In yet another aspect, the presently disclosed and/or claimed inventive concept(s) relates to a low molecular weight graft terpolymer produced by polymerizing a mono-ethylenically unsaturated carboxylic acid and two different mono-ethylenically unsaturated monomers to form a terpolymer and grafting a morpholine compound to the terpolymer. The two mono-ethylenically unsaturated monomers are different from the mono-ethylenically unsaturated carboxylic acid for making the terpolymer.

The mono-ethylenically unsaturated carboxylic acids can have from about 3 to about 8 carbon atoms. Examples can include, but are not limited to, acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid, itaconic acid, and combinations thereof. The mono-ethylenically unsaturated carboxylic acids can be used in the polymerization as free acids, as anhydrides and in partially or completely neutralized forms.

The mono-ethylenically unsaturated monomers can be represented by the following general formula (I):

$$R_1R_2C=CR_3R_4 \qquad \text{Formula (I)}$$

where $R_1$-$R_4$ are independently hydrogen, $C_1$-$C_{20}$ alkyl, $C_1$-$C_{20}$ cycloalkyl, $C_6$-$C_{24}$ aryl, halogen, cyano, $C_1$-$C_{20}$ alkylacid, $C_1$-$C_{20}$ cycloalkylacid, $C_1$-$C_{20}$ alkylester, $C_1$-$C_{20}$ cycloalkylester, $C_1$-$C_{20}$ alkylamide, $C_1$-$C_{20}$ cycloalkylamide, $C_6$-$C_{24}$ acrylacid, $C_6$-$C_{24}$ acrylester, or $C_6$-$C_{24}$ acrylamide.

The mono-ethylenically unsaturated monomers can be selected from the group consisting of acrylic acid, methacrylic acid, crotonic acid, itaconic acid, aconitic acid, alkyl acrylic or methacrylic ester, acrylonitrile, acrylamide, vinyl acetate, styrene, α-methylstyrene, methyl vinyl ketone, acrolein, ethylene, propylene, and combinations thereof.

In one non-limiting embodiment, the monomers for the low molecular weight graft terpolymer can be maleic acid or anhydride, vinyl acetate and alkyl acrylic or methacrylic ester monomers.

The alkyl acrylic or methacrylic ester can be an alkyl acrylate or alkyl methacrylate. The esters which are operative in the presently disclosed and/or claimed inventive concept(s) are alkyl esters of acrylic and methacrylic acids in which the alkyl groups contain from about 1-8 carbon atoms including methyl, ethyl, propyl, butyl, isobutyl, 2-ethyl hexyl, and octyl groups. Suitable alkyl acrylate monomers can include, but are not limited to, methyl acrylate, ethyl acrylate, propyl acrylate, butyl acrylate, isopropyl acrylate and tert-butyl acrylate.

Suitable morpholine compounds can be presented by Formula (II):

Formula (II)

where R is H, $C_1$-$C_{20}$ aliphatic being liner or branched, or aromatic; and $R_1$-$R_4$ are independently H, $C_1$-$C_{20}$ aliphatic being linear or branched, aromatic, or $(CH_2)_nX$, where n=0-20 and X is OH, COOH, SH, NH, Cl, F, Br, or I.

In one non-limiting embodiment, the morpholine compounds of Formula (II) can include, but are not limited to, morpholine, methylmorpholine, ethylmorpholine, propylmorpholine, butylmorpholine, pentylmorpholine, hexylmorpholine, heptylmorpholine, octylmorpholine, nonylmorpholine, decylmorpholine, undecylmorpholine, dodecylmorpholine, morpholinecarboxylic acid, hydroxymethylmorpholine, chloroethylmorpholine, aminomethylmorpholine, aminopropylmorpholine, 3-chloro-2-morpholin-4-phenylamine, 4-chloro-5-(4-morpholinyl)-1,2-benzendiamine, 3-chloro-4-(4-morpholinyl)aniline.

Other suitable morpholine compounds can be represent by Formula (III)

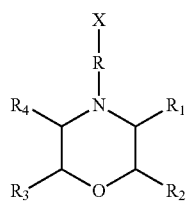

Formula (III)

where R is H, $C_1$-$C_{20}$ aliphatic being linear or branched, or aromatic; $R_1$-$R_4$ are H; and X is OH, $NH_2$, COOH, Cl, Br, I, or SH.

In one non-limiting embodiment, the morpholines of Formula (III) can include, but are not limited to, alpha-2,6-trimethyl-4-morpholineethanol, 4-(2-hydroxypropyl)morpholine, 4-(2-aminoethyl)morpholine, 4-(2-aminopropyl)morpholine, 4-(2-hydroxyethyl)morpholine, 4-(2-chloroethyl)morpholine, 4-(2-carboxyethyl)morpholine, alpha-phenyl-4-morpholineethanol, aminomorpholine, morpholin-4-yl-acetic acid, 4-(2-chloroethyl)morpholine, 2-morpholin-4-ylethanethiol, and 4-(2-hydroxyethyl)morpholine.

The morpholine compound can be polymerizable morpholine derivatives (incorporated onto the polymer backbone). Examples can include, but are not limited to, 4-acryloylmorpholine, 4-(2-ethyl-1-butenyl)morpholine and N-allyl-N'-(4-morpholinylmethyl)urea. Other morpholine compounds can include 4-(N-(5-chloro-2-methylphenyl)carbamoyl)morpholine, ethyl 4-morpholinylacetate, 4-allyl-2-[(2,6-dimethyl-4-morpholinyl)methyl]-6-methoxyphenol, (Z)-chloro(4-morpholinyl)methylidenephosphoramidic dichloride, 4-)N-(4-chloro-2-methylphenyl)-2,6-dimethylmorpholine, N-(imino-(2-methyl-3-phenyl-morpholin-4-yl)-methyl)guandine, 4-(2-chloro-6-ditrophenyl)morpholine, N-(2-(4-chloro-phenyl)-1-(morpholine-4-carbonyl)vinyl)-4-nitro-bezamide, 3-chloro-4-morpholinobenzoic acid, 2-[2E)-2-(3-chloro-4-nitrobenzylidene)hydrazino]-N-[2-(4-morpholinylcarbonyl)phenyl]-2-oxoacetamide, 2-[2E)-2-(5-chloro-2-nitrobenzylidene)hydrazino]-N-[2-(4-morpholinylcarbonyl)phenyl]-2-oxoacetamide, 2-[2E)-2-(5-chloro-2-hydroxybenzylidene)hydrazino]-N-[2-(4-morpholinylcarbonyl)phenyl]-2-oxoacetamide, 2-(2-(3-CL-benzylidene)hydrazine)-N-(2-(4-morpholinylcarbonyl)PH)-2-oxoacetamide, N-(2-(4-morpholinyl)ethyl)-2-phenyl-4-quinolineamine, 2-(((@E)-2-{2-[3-bromobenzyl)oxy]benzylidene}hydrazine)-N-[2-(4-morpholinylcarbonyl)phenyl]-2-oxoacetamide, 6-cholo-4-(4-morpholinyl)-2-phenylquinoline, 4-(4-morpholinyl)benzaldehyde-3,4,5-tetrahydro-2H-azepin-7-ylhydrazom, and 1-chloro-2,4-dimopholino-5-nitrobenzene.

In one non-limiting embodiment, a graft terpolymer of the presently disclosed and/or claimed inventive concept(s) can be produced by polymerizing a mixture of vinyl acetate, maleic anhydride and an alkyl acrylate in the presence of a free radical producing catalyst (also called initiator) and a solvent to form a terpolymer. The formed terpolymer is then grafted by adding morphine to form the graft terpolymer. The graft terpolymer is then hydrolyzed to form a final product. The whole process is shown below.

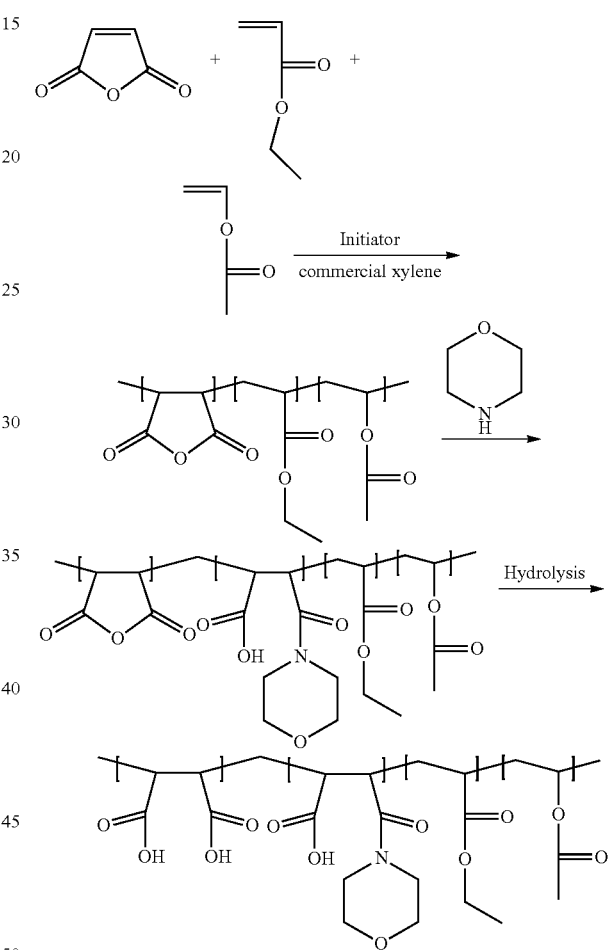

The polymerization reaction can be conducted at 60° C. or above. The upper limit of the reaction temperature will depend on the type of initiators and chain transfer agents. In addition, it will depend on the controllability of the reaction rate and on the reflux temperature of the solvent or mixture thereof provided that the employed solvent or mixture thereof boils at a temperature higher than 60° C. In one non-limiting embodiment, the reaction temperature can be varied in a range of about 65° C. to about 155° C. In another non-limiting embodiment, the reaction temperature can be varied in a range of about 70° C. to about 150° C. In yet another non-limiting embodiment, the reaction temperature can be varied in a range of about 90° C. to about 150° C. In yet another non-limiting embodiment, the reaction temperature can be varied in a range of about 120° C. to about 150° C.

The reaction time can be varied according to the particular starting materials used. The usual course of the polymerization can be followed by observing the precipitation of the polymer as fine particulate granules. The polymerization is substantially complete when precipitation ceases. The polymerization time can be varied in a range of about 1 to about 10 hours. In one non-limiting embodiment, the polymerization time can be varied in a range of about 3 to about 5 hours. The formed terpolymer is then cooled down to about 90 to 100° C. A morpholine compound is added at this temperature for about 1 to about 2 hours. The terpolymer grafted with morpholine is then hydrolyzed using water, dilute acid or alkali.

The homopolymer or copolymer grafted with morpholine can have a molecular weight between about 500 Daltons and about 200,000 Daltons. In one non-limiting embodiment, the polymer grafted with morpholine can have a molecular weight between about 500 Daltons and about 100,000 Daltons. In another non-limiting embodiment, the polymer grafted with morpholine can have a molecular weight between about 500 Daltons and about 50,000 Daltons. In yet another non-limiting embodiment, the polymer grafted with morpholine can have a molecular weight between about 500 Daltons and about 10,000 Daltons. In yet another non-limiting embodiment, the polymer grafted with morpholine can have a molecular weight between about 500 Daltons and about 5,000 Daltons.

The terpolymer grafted with morpholine can have a molecular weight between about 500 Daltons and about 200,000 Daltons. A more suitable graft terpolymer polymerized from maleic anhydride, alkyl acrylate and vinyl acetate can have a molecular weight between about 500 Daltons and about 5,000 Daltons.

The graft terpolymer can be prepared by polymerizing the unsaturated carboxylic acid monomer in an amount of about 30% to about 99% by weight of the graft terpolymer, the vinyl acetate monomer in an amount of about 1% to about 60% by weight of the graft terpolymer, and the alkyl acrylate monomer in an amount of about 1% to about 60% by weight of the graft terpolymer to form a terpolymer; and grafting the morphine compound in an amount of about 0.5% and about 10% by weight of the graft terpolymer onto the terpolymer.

In one non-limiting embodiment, the graft terpolymer can be prepared by polymerizing the unsaturated carboxylic anhydride monomer in an amount of about 40% to about 99% by weight of the graft terpolymer, the vinyl acetate monomer in an amount of about 1% to about 50% by weight of the graft terpolymer, and the alkyl acrylate monomer in an amount of about 1% to about 50% by weight of the graft terpolymer to form a terpolymer; and grafting the morphine compound in an amount of about 1% and about 5% by weight of the graft terpolymer onto the terpolymer.

The alkyl acrylate and/or vinyl acetate monomers may be hydrolyzed in the concentrate or in the use composition. For example, the alkyl acrylate and/or vinyl acetate segments can be hydrolyzed to carboxylic acids at a high pH. The alkyl acrylate and/or vinyl acetate segments may be partially or completely hydrolyzed in the concentrate and/or use solution. In one example, the terpolymer may be produced by at least one hydrolyzed vinyl acetate or alkyl acrylate monomer. Additionally, as used herein, reference to maleic acid monomers can include monomers of maleic acid, malice anhydride, and salts thereof.

The free radical producing catalysts used in the presently disclosed and/or claimed inventive concept(s) can be peroxy type catalysts including organic and inorganic peroxides and hydroperoxides, esters of peracids such as peracetic acid and perbenzoic acid, etc. Other free radical producing catalysts such as azonitriles, other organic azo compounds, tetra-alkyl diamino diphenyl methanes, etc., can also be used. For many purposes it is desirable to use two or more catalysts. In one non-limiting embodiment, the catalyst can be di-tert-butyl peroxide (DTBP). The total amounts of catalyst may vary between about 0.1 and about 0.5 parts per 100 parts of the total monomer.

Generally, the morpholine compound used for grating the terpolymer can be varied in a range of about 0.1 to about 30% by weight of the total weight of the terpolymer. In one non-limiting embodiment, the morpholine compound can be varied in a range of about 1 to 2 about 5% by weight. In another non-limiting embodiment, the morpholine compound can be varied in a range of about 2 to about 20% by weight. In yet another non-limiting embodiment, the morpholine compound can be varied in a range of about 5 to about 10% by weight.

The solvent can be an aromatic hydrocarbon such as benzene, toluene, xylene, and mixtures thereof. The solvent can also be a mixture of a cycloaliphatic hydrocarbon such as cyclohexane and an ester of an aliphatic acid such as ethyl acetate. In one non-limiting embodiment, the solvent is xylene. In another non-limiting embodiment, the solvent is a 50:50 (weight ratio) mixture of cyclohexane and ethyl acetate.

Additionally, the presently disclosed and/or claimed inventive concept(s) relates to a scale inhibitor composition comprising the low molecular weight graft polymer. Furthermore, the presently disclosed and/or claimed inventive concept(s) relates to a process for preventing the deposition of scale from water or aqueous solution and a method for scale inhibition treatment of an oil or gas production well by using the low molecular weight graft polymer. The graft polymers can be the graft homopolymers, copolymers and terpolymers as described previously. The scale inhibitor is low corrosive for application in the oilfield.

An effective amount of the scale inhibitor composition against scale formation may vary based on various factors including, but are not limited to, the particular system to be treated, the scale inhibiting moieties, the area subjected to scale deposition, water quantity, pH, temperature, or concentration of the scale forming species. In one non-limiting embodiment, an effective amount of the scale inhibitor composition may be less than 50 ppm. In another non-limiting embodiment, the effective amount may be varied from about 5 ppm to about 25 ppm. In yet another embodiment, the effective amount may be varied from about 7 ppm to about 15 ppm.

The aqueous low molecular weight graft polymer solution prepared can directly be used as a scale inhibitor composition without further treatment. The scale inhibitor composition may be added to the oilfield fluids such as produced water or injection water during secondary recovery processor periodically, continually or continuously. Furthermore, the scale inhibitor composition may be added by squeeze applying to the subterranean formations. Additionally, the scale inhibitor composition may be applied by other techniques commonly used offshore including, but not limited to, gas-lift injection, downhole annulus injection, encapsulation or soluble matrix techniques, sub-sea wellhead injection, or secondary topside treatment.

In one non-limiting embodiment, a method for scale inhibition treatment of oil or gas production well comprises adding the low molecular weight graft polymer solution to the oilfield fluids subjected to scale formation; measuring an amount of the scale inhibitor composition in the oilfield fluids; and further adding the scale inhibitor composition to the oilfield fluids when the measured amount of the scale inhibitor composition is approaching a minimum inhibition concentration of the scale inhibitor composition.

The minimum inhibitor concentration of the scale inhibitor composition can be measured using any known technique. For example, as shown in the Examples described herein, the minimum inhibitor concentration of the sale inhibitor composition may be measured using a dynamic scale loop (DSL) test. At the field site, the operators may quickly determine an amount of the scale inhibitor composition in the tested fluids. By comparing the detected amount of the scale inhibitor composition in the tested fluids with the minimum inhibitor concentration of the scale inhibitor composition, the operators may readily decide when it is most suitable to apply additional scale inhibitor composition, and at which rate and amount the additional scale inhibitor composition should be added into the fluids.

In another non-limiting embodiment, a method for scale inhibition treatment of oil or gas production well includes squeeze applying the scale inhibitor composition comprising the low molecular weight graft polymer solution to the subterranean formations. In the squeeze treatment application, the scale inhibitor composition may be used in conjunction with spearhead chemicals, surfactants and/or emulsifiers. These chemicals may be applied prior to the squeeze treatment of the scale inhibitor composition to aid adsorption onto the rock and to minimize emulsification problems.

In a normal "squeeze" treatment, it may be difficult to control the concentration of the scale inhibitor composition returning in produced brines. The scale inhibitor composition may be produced quickly initially, with its concentrations tailing off with time to ineffective amounts. Spearhead chemicals, surfactants and/or emulsifiers, or pH adjustment can used to control or delay the return time of the scale inhibitor (i.e., increase squeeze lifetime).

In addition to oilfield applications, the scale inhibitor composition may be used as a scale inhibitor in any industrial water system where scale inhibition is needed. Examples of such industrial water systems may include, but are not limited to, cooling tower water systems; boiler water systems; hot water heaters; heat exchangers; mineral process waters; paper mill water systems; black liquor evaporators in the pulp industry; desalination systems; cleaning system; pipelines; gas scrubber systems; continuous casting processes in the metallurgical industry: air conditioning and refrigeration systems; industrial and petroleum process water; water reclamation and purification systems; membrane filtration water systems; food processing streams; and waste treatment systems.

The scale inhibitor composition of the presently disclosed and/or claimed inventive concept(s) may be used in combination with other water treatment agents, if other agents are compatible with the scale inhibitor composition and do not cause precipitations of the scale inhibitor composition. Non-limiting examples of other water treatment agents may include, hut are not limited to, viscosification agents; surfactants such as anionic surfactants, non-ionic surfactants and cationic surfactants; sequestrates; chelating agents: corrosion inhibitors; hydrate inhibitors; anti-agglomeration agents; asphaltene inhibitors wax inhibitors; biocides; bleaches; demulsifiers; foam controlling agents; oxygen scavengers; sulfide scavengers; pH controlling and/or buffering agents; chromium salts; zinc salts; dispersants; coagulants; or combinations thereof.

The following examples illustrate the presently disclosed and/or claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLES

Pitting Index

The pitting index is an assessment measurement to determine how severe a substrate is damaged by pitting corrosion. It is determined by observing and measuring the size of pitting corrosion area on carbon steel coupon. In the presently disclosed and claimed inventive concept(s), the pitting index was determined according to Table 1.

TABLE 1

| Description for Pitting Index | Pitting Index |
| --- | --- |
| None | 0 |
| A couple of monitor corrosion (<5) on the coupon edge | 1 |
| A couple of monitor corrosion (>5) on the coupon edge | 2 |
| Small pin point pits on the coupon surface <25 mil | 3 |
| Small pin point pits on the coupon surface >25 mil | 4 |
| Pits on the coupon surface were 16 to 31 mil diameter and 8 to 16 mils depth. Total = 10 pits or less | 5 |
| Pits on the coupon surface were 16 to 31 mil diameter and 8 to 16 mils depth. Total = 11-25 pits. | 6 |
| Pits on the coupon surface were 16 to 31 mil diameter and 8 to 16 mils depth. Total >25 pits. | 7 |
| Large pits on the coupon surface with 63-126 mils diameter, more than 31 mils depth | 8 |
| more severe pitting than pitting index above | 9 |

Dynamic Testing of Scale Inhibitor Efficiency

The scale depositions under dynamic conditions were measured using PMAC DSL-250 system (available from Process Measurement and Control Systems, PMAC Systems). The system comprised a constant flow unit and a microbore test coil. The flow was provided by two High Pressure Liquid Chromatography (HPLC) pumps. The differential pressure across the microbore test coil due to the scale buildup in the coil was measured with time. The change of pressure with time (called the pressure curve) is indicative of the scale deposition rate within the coil, which can be used to measure the effectiveness of any scale inhibitors or cleaning agents that are injected into the flow unit.

Testing Solution Preparation

1. Cationic Brine Solution

Cationic Brine Composition

| Type of Ion | Quantity, mg/l |
| --- | --- |
| Chloride | 23500 |
| Barium | 130 |
| Calcium | 1400 |
| Strontium | 225 |

-continued

| Type of Ion | Quantity, mg/l |
|---|---|
| Magnesium | 275 |
| Sodium | 115000 |
| Potassium | 250 |

Into a suitable container weighed out of reagent grades of NaCl (32.55 g), CaCl.2H$_2$O (10.271 g), MgCl$_2$.6H$_2$O (4.600 g), KCl (0.953 g), SrCl$_2$.6H$_2$O (1.369 g) and BaCl$_2$.2H$_2$O (0.462 g). The reagents were transferred into a liter glass beaker containing 600 ml of deionized water and a clear solution was formed. The solution was then poured into a liter graduated flask to make a liter solution.

2. Anionic Brine Solution

Anionic Brine Composition

| Type of Ion | Quantity, mg/l |
|---|---|
| Chloride | 23500 |
| Sulfate | 800 |
| Bicarbonate | 800 |

Into a suitable container weighed out of reagent grades of NaCl (32.55 g), NaSO$_4$ (2.366 g) and NaHCO$_3$ (2.203 g). The reagents were transferred into a liter glass beaker containing 600 ml of deionized water and formed a clear solution. The solution was then poured into a liter graduated flask to make a liter solution.

3. Acetate Buffer

Into a suitable container weighed out of reagent grades of NaOAc (135 g) and 100% acetic acid (40 ml). The reagents were transferred into a liter glass beaker containing 600 ml of deionized water and formed a clear solution. The solution was then poured into a liter graduated flask to make a liter solution.

Polymer Preparation

Example 1

To a 1-L reactor, equipped with a heating apparatus, a temperature controller, a mixing stirrer, a water condenser and N$_2$ inlet/outlet, was charged with 140 g maleic anhydride and 140 g commercial xylene. The temperature was set to 150° C. while degassing for 30 min. Once maleic anhydride was melted, nitrogen was removed to the headspace to form a N$_2$ blanket. The mixing stirrer was turned on at 150 rpm. A monomer mixture was prepared by mixing 30 g ethyl acrylate, 30 g vinyl acetate, 7.5 g di-tert-butyl peroxide and 30 g commercial xylene. The monomer mixture was then fed into the reactor over 120 min once the internal reactor temperature reached to 120° C. Once the feed was finished, all the material in the reactor was held under reflux at 140° C. for another 3.5 hours. Then, the temperature was cooled down to 90-100° C. and 30 g morpholine was added into the reactor over 60 min. Additional 1 hour was held after addition. 330 g deionized water was added into the reactor and the reaction was kept for another 1.5 hrs. Xylene was distilled off and about 40% solids of the aqueous polymer solution was obtained.

Example 2

The aqueous polymer solution containing about 40% solids was prepared by the same method described in Example 1 except that 20 g morpholine was added into the reactor over 60 min.

Example 3

To a 1-L reactor, equipped with a heating apparatus, a temperature controller, a mixing stirrer, a water condenser and N$_2$ inlet/outlet, was charged 200 g maleic anhydride and 140 g commercial xylene. The temperature was set to 150° C. while degassing for 30 min. Once maleic anhydride was melted, nitrogen was removed to the headspace to form a N$_2$ blanket. The mixing stirrer was turned on at 150 rpm to form a first mixture. A second mixture containing 10 g ditert-butyl peroxide and 30 g commercial xylene was prepared. The second mixture was then fed into the reactor over 120 min once the internal reactor temperature was reached to 120° C. to mix with the first mixture. Once the feed was finished, 2 g ditert-butyl peroxide was added into the reactor and additional 3.5 hours were held under reflux at 140° C. Then, the temperature was cooled down to 90-100° C. and 30 g morpholine was added into the reactor over 60 min. Additional 1 hour was held after addition. 400 g deionized water was added into the reactor and the reaction was kept for another 1.0 to 1.5 hrs. Xylene was distilled off and about 30-45% solids of the aqueous polymer solution was obtained.

Example 4

To a 1-L reactor, equipped with a heating apparatus, a temperature controller, mixing stirrer, a water condenser and N$_2$ inlet/outlet, is charged 75 g acrylic acid, 25 g 2-acrylamido-2-methylpropane sulfonic acid (AMPS), 10 g sodium hypophosphite and 500 g DI water. The temperature is set to 70° C. while degassing for 30 min. Once AMPS is dissolved, nitrogen is removed to the headspace to form a N$_2$ blanket. The mixing stirrer is turned on at 150 rpm. 10 g sodium persulfate is dissolved in 100 g DI water to form a solution. The solution is then fed into the reactor over 60 min to form a mixture. Once the feed is finished, additional 3.5 hours are held at 70° C. Then, the temperature is cooled down to room temperature. The pH value of the mixture is adjusted to about 4-6 by adding 50% of NaOH solution. 15.5 g 1-ethyl-3-(3-dimethylaminopropyl)carbodiimide is added into the reactor. 8.7 g morpholine is added into the reactor over about 60 minutes. After the addition, the mixture is kept for another hour.

Polymer Application

Example 5

90 ml deoxygenized seawater solution was mixed with 10 ml of the aqueous polymer solution prepared from Example 1 and placed in a Duran bottle. A carbon steel coupon which was pre-washed with acetone and ethanol and pre-weighted was put into the bottle and sealed. The bottle was then placed in an oven at 90° C. for 24 hours. After 24 hours, the coupon was rinsed in fresh water and brushed clean, followed with acetone and methanol rinse and dried in an oven. The weight loss of the carbon steel coupon was measured and the pitting was inspected at 20× and 40× magnification. The pitting index was determined according to Table 1 and the results are shown in Table 2.

TABLE 2

| Scale Inhibitor | Test Temperature | Corrosion Rate | Pitting Index | pH Value |
|---|---|---|---|---|
| Bellasol S28* | 90° C. | 6-12 mm/y | 4-7 | <2 |
| Example 1 | 90° C. | 7.9 mm/y | 2 | 2.17 |

*Commercially available from BWA Water Additives, Tucker, GA, USA

Example 6—Scale Inhibitor Efficiency

The scale inhibitor efficiency was measured on a PMAC's Dynamic Scale Loop, which was the industry standard technique available from PMAC Products, UK. The testing solution was prepared based on the procedure described previously and contained cationic $Na^+$, $K^+$, $Ca^{2+}$, $Mg^{2+}$, $Sr^{2+}$, and $Ba^{2+}$, and anionic $Cl^-$, $SO_4^{2-}$ and $HCO_3^-$. The aqueous solutions from Examples 1 and 2 as well as commercial scale inhibitor Bellasol S28 were tested in the testing solution. The results are shown in FIG. 1. The polymer of the presently disclosed and/or claimed inventive concept(s) show higher inhibition efficiencies to $CaSO_4$ and $BaSO_4$ scale compared to the commercial one.

What is claimed is:
1. A composition comprising:
a graft terpolymer produced by polymerizing a mono-ethylenically unsaturated carboxylic acid monomer or mono-ethylenically unsaturated carboxylic anhydride monomer, vinyl acetate monomer and an alkyl acrylate monomer to form a terpolymer and grafting a morpholine compound onto the terpolymer.
2. The composition of claim 1, wherein the alkyl acrylate monomer is selected from the group consisting of methyl acrylate, ethyl acrylate, propyl acrylate, isopropyl acrylate, tert-butyl acrylate, hexyl acrylate, isooctyl acrylate, and combinations thereof.
3. The composition of claim 1, wherein the mono-ethylenically unsaturated carboxylic acid monomer is selected from the group consisting of acrylic acid, methacrylic acid, itaconic acid, maleic acid, crotonic acid, acrylamido-2-methylpropane sulfonic acid, and combinations thereof.
4. The composition of claim 1, wherein the mono-ethylenically unsaturated carboxylic anhydride monomer is selected from the group consisting of acrylic anhydride, methacrylic anhydride, itaconic anhydride, maleic anhydride, crotonic anhydride, and combinations thereof.
5. The composition of claim 1, wherein the morpholine compound is represented by Formula (I)

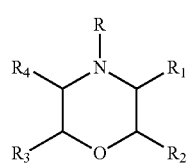

Formula (I)

wherein R is H, $C_1$-$C_{20}$ aliphatic being linear or branched, or aromatic; and $R_1$-$R_4$ are independently H, aliphatic being linear or branched, aromatic, or $(CH_2)_nX$, wherein n=0-20, and X is OH, COOH, SH, $NH_2$, Cl, F, Br, or I.

6. The composition of claim 5, wherein the morpholine compound is selected from the group consisting of morpholine, methylmorpholine, ethylmorpholine, propylmorpholine, butylmorpholine, pentylmorpholine, hexylmorpholine, heptylmorpholine, octylmorpholine, nonylmorpholine, decylmorpholine, undecylmorpholine, dodecylmorpholine, morpholinecarboxylic acid, hydroxymethylmorpholine, chloroethylmorpholine, aminomethylmorpholine, aminopropylmorpholine, 3-chloro-2-morpholin-4-phenylamine, 4-chloro-5-(4-morpholinyl)-1,2-benzendiamine, 3-chloro-4-(4-morpholinyl)aniline, and combinations thereof.
7. The composition of claim 1, wherein the morpholine compound is represented by Formula (II)

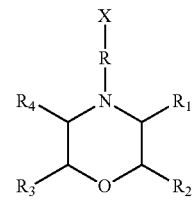

Formula (II)

wherein R is H, $C_1$-$C_{20}$ aliphatic being linear or branched, or aromatic; $R_1$-$R_4$ are H; and X is OH, $NH_2$, COOH Cl, Br, I or SH.

8. The composition of claim 7, wherein the morpholine is selected from the group consisting of alpha-2,6-trimethyl-4-morpholineethanol, 4-(2-hydroxypropyl)morpholine, 4-(2-aminoethyl)morpholine, 4-(2-aminopropyl)morpholine, 4-(2-hydroxyethyl)morpholine, 4-(2-chloroethyl)morpholine, 4-)2-carboxyethyl)morpholine, alpha-phenyl-4-morpholineethanol, and combinations thereof.
9. The composition of claim 1, wherein the graft terpolymer has a molecular weight of about 500 to about 20,000 Daltons.
10. The composition of claim 1, wherein the graft terpolymer is produced by polymerizing the unsaturated carboxylic acid monomer in an amount of about 30% to about 99% by weight of the graft terpolymer, the vinyl acetate monomer in an amount of about 1% to about 60% by weight of the graft terpolymer, and the alkyl acrylate monomer in an amount of about 1% to about 60% by weight of the graft terpolymer to form a terpolymer; and grafting the morphine compound in an amount of about 0.5% to about 10% by weight of the graft terpolymer onto the terpolymer.
11. The composition of claim 10, wherein the graft terpolymer is produced by polymerizing the unsaturated carboxylic anhydride monomer in an amount of about 40% to about 99% by weight of the graft terpolymer, the vinyl acetate monomer in an amount of about 1% to about 50% by weight of the graft terpolymer, and the alkyl acrylate monomer in an amount of about 1% to about 50% by weight of the graft terpolymer to form a terpolymer; and grafting the morphine compound in an amount of about 1% to about 5% by weight of the graft terpolymer onto the terpolymer.
12. The composition of claim 1, wherein the vinyl acetate monomer comprises at least one hydrolyzed vinyl acetate.
13. The composition of claim 1, wherein the alkyl acrylate monomer comprises at least one hydrolyzed alkyl acrylate.
14. A scale inhibitor composition comprising the composition of claim 1.
15. The scale inhibitor composition of claim 14, further comprising a compound selected from the group consisting of sodium ally methyl sulfonate, sodium allyl sulfonate, vinyl sulfonate, and combinations thereof.

16. A process for preventing the deposition of scale from water or aqueous solution, comprising:
adding to the water or the aqueous solution 0.1 to 100 parts per million by weight of the scale inhibitor composition of claim 14.

17. The process of claim 16, wherein the graft terpolymer is hydrolyzed with water.

18. A method for scale inhibition treatment of an oil or gas production well, comprising:
injecting the scale inhibitor composition of claim 14 into the oil or gas production well.

19. The method of claim 18, wherein the injection of the scale inhibitor composition into the oil or gas production well occurs during a squeeze application or topside application.

20. The method of claim 18, wherein the scale inhibition treatment is at a temperature ranged from about 100 to about 500° F.

21. The method of claim 18, wherein the scale inhibition treatment is at a pressure ranged from about 100 psi to about 1000 psi.

\* \* \* \* \*